United States Patent
Shimada et al.

(10) Patent No.: US 6,845,422 B2
(45) Date of Patent: Jan. 18, 2005

(54) DATA-STORING DEVICE

(75) Inventors: Masaki Shimada, Hachioji (JP); Mitsuru Watanabe, Hachioji (JP); Kiyotaka Murakami, Hachioji (JP)

(73) Assignee: Konica Corporation, Tokyo (JP)

( * ) Notice: Subject to any disclaimer, the term of this patent is extended or adjusted under 35 U.S.C. 154(b) by 468 days.

(21) Appl. No.: 09/986,614

(22) Filed: Nov. 9, 2001

(65) Prior Publication Data

US 2002/0057608 A1 May 16, 2002

(30) Foreign Application Priority Data

Nov. 14, 2000 (JP) ........................................ 2000-347135

(51) Int. Cl.[7] .............................. G06F 13/14; G06F 1/26
(52) U.S. Cl. ........................ 710/305; 710/313; 713/340
(58) Field of Search ............................. 710/1, 62, 110, 710/305, 313; 713/300, 340; 348/552; 360/55; 369/69; 386/46, 125

(56) References Cited

U.S. PATENT DOCUMENTS

| | | | |
|---|---|---|---|
| 5,675,813 A | | 10/1997 | Holmdahl |
| 5,784,581 A | * | 7/1998 | Hannah ........................ 710/110 |
| 6,289,397 B1 | * | 9/2001 | Tsuyuguchi et al. ............. 710/1 |
| 6,678,464 B1 | * | 1/2004 | Kawai et al. ................... 386/94 |
| 6,691,187 B1 | * | 2/2004 | Schwerin ....................... 710/62 |
| 6,711,343 B1 | * | 3/2004 | Matsumi et al. ............... 386/46 |
| 2002/0114613 A1 | * | 8/2002 | Thai |

FOREIGN PATENT DOCUMENTS

| | | |
|---|---|---|
| EP | 1022643 A2 | 7/2000 |
| JP | 2000214954 | 4/2000 |

OTHER PUBLICATIONS

European Search Report.

* cited by examiner

*Primary Examiner*—Khanh Dang
(74) *Attorney, Agent, or Firm*—Finnegan, Henderson, Farabow, Garrett & Dunner, L.L.P.

(57) ABSTRACT

The present invention concerns a data-storing device, which is coupled to a personal computer through an interface and can enlarge a number of and a kind of devices connectable to the personal computer. The data-storing device includes an interfacing circuit that includes a data communication path through which the data can be bilaterally communicated between the device and an external device, which is coupled to the device with an interface cable, and a power-supplying path through which a power current can be bilaterally supplied between the device and the external device, wherein the interface cable also includes the data communication path and the power-supplying path; a data-storing unit to store the data sent from the interfacing circuit; and a plurality of interface connecting ports serving as input/output terminals of the interfacing circuit, wherein the interface cable can be connected to one of the interface connecting ports.

8 Claims, 8 Drawing Sheets

Prior Art

Prior Art

DATA-STORING DEVICE

BACKGROUND OF THE INVENTION

The present invention relates to an interfacing technology, which is mainly employed in personal computers and can enlarge a number of and a kind of devices connectable to the personal computers.

A personal computer, put in the market, incorporates connectors (also referred to as terminals or connecting ports) to which various kinds of peripheral devices can be coupled. Such the personal computer also incorporates expansion slots (such as PCI, ISA, VL, etc.), mounted on a circuit board disposed in the interior of the personal computer, to expand its functions. In order to increase new functions in addition to default functions of the personal computer, various kinds of circuit boards can be mounted onto such the expansion slots. This makes it possible to add various kinds of new functions to the personal computer. For instance, one of the new functions is an interfacing function for coupling an external peripheral device to the personal computer, and circuit boards having such the interfacing function include multi I/O boards, SCSI (Small Computer System Interface) boards, USB (Universal Serial Bus) boards, IEEE1394 boards, etc.

Even if such a board as mentioned above can be added to the personal computer, however, a number of connecting ports for the interfacing function is limited.

Further, when a SCSI or a USB interface is employed, a predetermined number of peripheral devices can be coupled to the personal computer in a daisy-chain mode. Recently, the USB interface has been proliferated widely, since the USB interface has not only a high-adaptability for general purposes, but also high-speed and intelligent features, compared to the SCSI interface.

In fact, external data-storing devices, which employ the USB and/or IEEE1394 interface(s) for coupling it to the personal computer, such as a MOD (Magnet-Optics Disk Drive), a HDD (Hard Disk Drive), a CD-R/RW (Recordable/ReWritable Compact Disk Drive), etc., have been widely put in the market.

FIG. 7 shows a personal computer and an external data-storing device, which are coupled each other. In FIG. 7, numeral 1 indicates a personal computer, to which an external data-storing device is coupled through a USB cable.

In most of such the external data-storing devices, a bridge system having a conventional ATAPI or a conventional SCSI, serving as an interface, is added to an external data-storing unit (such as an inhouse-MOD, an inhouse-HDD, an inhouse-CD-R/RW, etc., so to speak).

This is because of the following reasons.

1. An enormous amount of cost and time would be required for developing and manufacturing external data-storing units having a new interface facility.
2. It is impossible to determine at present what kind of interface facility should be the mainstream for the future.

Owing to the abovementioned reasons, the meritorious solution has been to develop or purchase the bridge system for converting the ATAPI or the SCSI into the USB or the IEEE1394 interface, in order to externally connect it to the personal computer.

FIG. 8 shows an example of an outsight configuration of an external data-storing device having the USB or the IEEE1394 interface. This configuration makes conventional external data-storing unit 10 usable by adding bridge system 20 to conventional external data-storing unit 10. Bridge system 20 is assembled by mounting various kinds of necessary parts onto the circuit board. In bridge system 20, numerals 21, 22, 23 and 24 indicate a power jack, a power switch, a USB or an IEEE1394 connector and an ATAPI or a SCSI connector, respectively, and those are connected onto bridge system 20. As described in the above, the bridge system allows the data-storing unit having a conventional ATAPI or a conventional SCSI to be utilized as the data-storing device being active with the USB or the IEEE1394 interface.

One or at most two of USB connecting ports has/have been equipped in a conventional personal computer put in the market, and as for IEEE1394 connecting ports, only one port has been allocated for its purpose in the personal computer. Therefore, when a certain small number of devices occupy those USB or IEEE1394 connecting ports, other devices could not be connected to the personal computer. To overcome this inconvenience, a unit named "Hub" has been provided as a "data-distributing" unit, which makes a "multiple-distribution wiring" possible.

It has been a problem, however, that employing such the "Hub" makes wirings between peripheral devices complicated. Further, although the USB or the IEEE1394 interface has such a feature that a power current can be also supplied to the peripheral device through the interface, the "Hub" is not always provided with a function of distributing the power current to plural devices. As a result, there have been many cases that some of the peripheral devices connected through the "Hub" cannot work properly.

SUMMARY OF THE INVENTION

To overcome the abovementioned drawbacks in conventional data-storing devices, it is an object of the present invention to provide a data-storing device, which employs the abovementioned interface and makes it possible to bilaterally supply the power current between the data-storing device and other devices coupled through the interface and to operate the whole system including the coupled devices in a good power balance by controlling the power-supplying mode corresponding to the states of the devices.

Accordingly, to overcome the cited shortcomings, the abovementioned object of the present invention can be attained by data-storing devices described as follow.

(1) A device for storing data, comprising: an interfacing circuit that includes a data communication path through which the data can be bilaterally communicated between the device and an external device, which is coupled to the device with an interface cable, and a power-supplying path through which a power current can be bilaterally supplied between the device and the external device, wherein the interface cable also includes the data communication path and the power-supplying path; a data-storing unit to store the data sent from the interfacing circuit; and a plurality of interface connecting ports serving as input/output terminals of the interfacing circuit, wherein the interface cable can be connected to one of the interface connecting ports.

(2) The device of item 1, wherein the external device is a personal computer and the data-storing unit is a magneto-optics disk drive, and a peripheral device can be also coupled to the device through another one of the interface connecting ports with another interface cable.

(3) A device for storing data, comprising: an interfacing circuit that includes a data communication path through which the data can be bilaterally communicated between the device and an external device, which is coupled to the device with a first interface cable, and a power-supplying path through which a power current can be bilaterally supplied between the device and the external device, wherein the first interface cable also includes the data communication path and the power-supplying path; a data-storing unit to store the data sent from the interfacing circuit; a plurality of interface connecting ports serving as input/output terminals of the interfacing circuit, wherein the first interface cable can be connected to a first interface connecting port being one of the interface connecting ports; and a power-supply section to supply a first power current for driving the data-storing unit.

(4) The device of item 3, wherein a peripheral device can be also coupled to the device through a second interface connecting port being another one of the interface connecting ports with a second interface cable.

(5) The device of item 4, wherein a second power current, being a part of the first power current outputted by the power-supply section, is also supplied to the peripheral device through the power-supplying path included in the second interface cable connected to the second interface connecting port.

(6) The device of item 5, wherein the external device is a personal computer and the data-storing unit is a magneto-optics disk drive.

(7) The device of item 5, further comprising: a power controller to control an amount of the second power current to be supplied to the peripheral device.

(8) The device of item 5, further comprising: a power controller to control the interfacing circuit in such a manner that a third power current, supplied from the external device through the first interface connecting port, is further supplied to the peripheral device through the second interface connecting port, only when the power controller detects that the power-supply section is activated.

(9) A device for storing data, comprising: an interfacing circuit that includes a data communication path through which the data can be bilaterally communicated between the device and an external device, which is coupled to the device with a first interface cable, and a power-supplying path through which a power current can be bilaterally supplied between the device and the external device, wherein the interface cable also includes the data communication path and the power-supplying path; a data-storing unit to store the data sent from the interfacing circuit; a plurality of interface connecting ports serving as input/output terminals of the interfacing circuit, wherein the first interface cable can be connected to a first interface connecting port being one of the interface connecting ports, and plural peripheral devices are coupled to the device with plural interface cables through the interface connecting ports other than the first interface connecting port; a power-supply section to supply power currents for driving the peripheral devices and for driving units and sections included in the device, wherein the units includes the data-storing unit; a detecting section to detect power-status information sets pertaining to amounts of the power currents required for driving the peripheral devices coupled through the interface connecting ports and required for driving the units and sections included in the device; and a power controller to adjust each of the amounts of the power currents to be distributed among the peripheral devices, the units and sections, on the basis of the power-status information sets detected by the detecting section.

(10) The device of item 9, wherein a power current, supplied from the external device through the first interface connecting port and further supplied to one of the peripheral devices through one of the interface connecting ports, passes through the interfacing circuit as it is.

(11) The device of item 9, wherein the power controller controls a power-supplying mode of the device, so as to share a total amount of a power current, supplied from the external device coupled through the first interface connecting port, and another power current, supplied from the power-supply unit, among the peripheral devices coupled through the interface connecting ports other than the first interface connecting port.

(12) The device of item 9, wherein the external device is a personal computer and the data-storing unit is a magneto-optics disk drive.

(13) The device of item 9, wherein the power controller is driven by a power current supplied from the external device through the first interface connecting port.

(14) The device of item 9, wherein the power controller is driven by a power current supplied from the power-supply section when the power-supply section is activated, while the power controller is driven by a power current supplied from the external device through the first interface connecting port when the power-supply section is deactivated.

Further, to overcome the abovementioned problems, other data-storing devices, embodied in the present invention, will be described as follow:

(15) A data-storing device, characterized in that,
in the data-storing device provided with the interface, which has two paths including a data path for transmitting and receiving data and a power source path through which an operating power current is received from an original connecting device and/or the operating power current is supplied to coupled devices, and a data-storing unit,
the data-storing device comprises a plurality of interface connecting ports.

(16) A data-storing device, characterized in that,
in the data-storing device provided with the interface, which has two paths including a data path for transmitting and receiving data and a power source path through which an operating power current is received from an original connecting device and/or the operating power current is supplied to coupled devices, and a data-storing unit,
the data-storing device comprises a plurality of interface connecting ports and a power-supply section to supply a power current for driving the data-storing unit.

(17) A data-storing device, characterized in that,
in the data-storing device provided with the interface, which has two paths including a data path for transmitting and receiving data and a power source path through which an operating power current is received from an original connecting device and/or the operating power current is supplied to coupled devices, and a data-storing unit,
the data-storing device comprises a plurality of interface connecting ports and a power-supply section to supply a power current for driving the data-storing unit, and a part of the first power current supplied from the power-supply section through the power source path is supplied to the device coupled through the interface connecting port.

(18) A data-storing device, characterized in that,
in the data-storing device provided with the interface, which has two paths including a data path for transmitting and receiving data and a power source path through which an operating power current is received from an original connecting device and/or the operating power current is supplied to coupled devices, and a data-storing unit, the data-storing device comprises a plurality of interface connecting ports, a power-supply section to supply a power current for driving the data-storing unit, and a power-source controlling section to adjust an amount of power current to be supplied, when a part of the first power current supplied from the power-supply section through the power source path is supplied to the device coupled through the interface connecting port.

(19) A data-storing device, characterized in that, in the data-storing device provided with the interface, which has two paths including a data path for transmitting and receiving data and a power source path through which an operating power current is received from an original connecting device and/or the operating power current is supplied to coupled devices, and a data-storing unit, the data-storing device comprises a plurality of interface connecting ports, a power-supply section to supply a power current for driving the data-storing unit, and a power-source controlling section to supply a power current to the coupled device with adding new power source to the power-source path from the power-supply section only when the power-supply section is activated, in case that the operating power source supplied from the original connecting device through a certain interface connecting port is supplied to the device coupled through another interface connecting port.

(20) A data-storing device, characterized in that, in the data-storing device provided with the interface, which has two paths including a data path for transmitting and receiving data and a power source path through which an operating power current is received from an original connecting device and/or the operating power current is supplied to coupled devices, and a data-storing unit, the data-storing device comprises a plurality of interface connecting ports, a power-supply section to supply a power current for driving the data-storing unit wherein the power-supply section is also capable of supplying a power current to the coupled device, a detecting section to detect power-source information, which is necessary for the device and the other device, through the data path in regard to the devices including the data-storing unit and coupled through the interface, and a power-source controlling section to adjust the share of the amounts of the power currents to be distributed, on the basis of the power-source information obtained by the detecting section, when supplying the power currents to the devices including the data-storing unit and coupled through the interface.

(21) The data-storing device described in item 20, characterized in that, when supplying the power currents to the devices including the data-storing unit and coupled through the interface, an operating power source, supplied from the original connecting device coupled through the interface, passes through.

(22) The data-storing device described in item 20, characterized in that, when supplying the power currents to the devices including the data-storing unit and coupled through the interface, the power-supply section adjust the share of a total amount of a power current, supplied from the original connecting device coupled through the interface connecting port, and another power current, supplied from the power-supply section.

(23) The data-storing device described in any one of items 18–22, characterized in that, the power-supply section is driven by the operating power source supplied from the original connecting device.

(24) The data-storing device described in any one of items 18–22, characterized in that, the power-supply section is driven by the power source supplied from the power-supply section when the the power-supply section is activated, while the power-supply section is driven by the operating power source supplied from the original connecting device when the power-supply section is activated.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
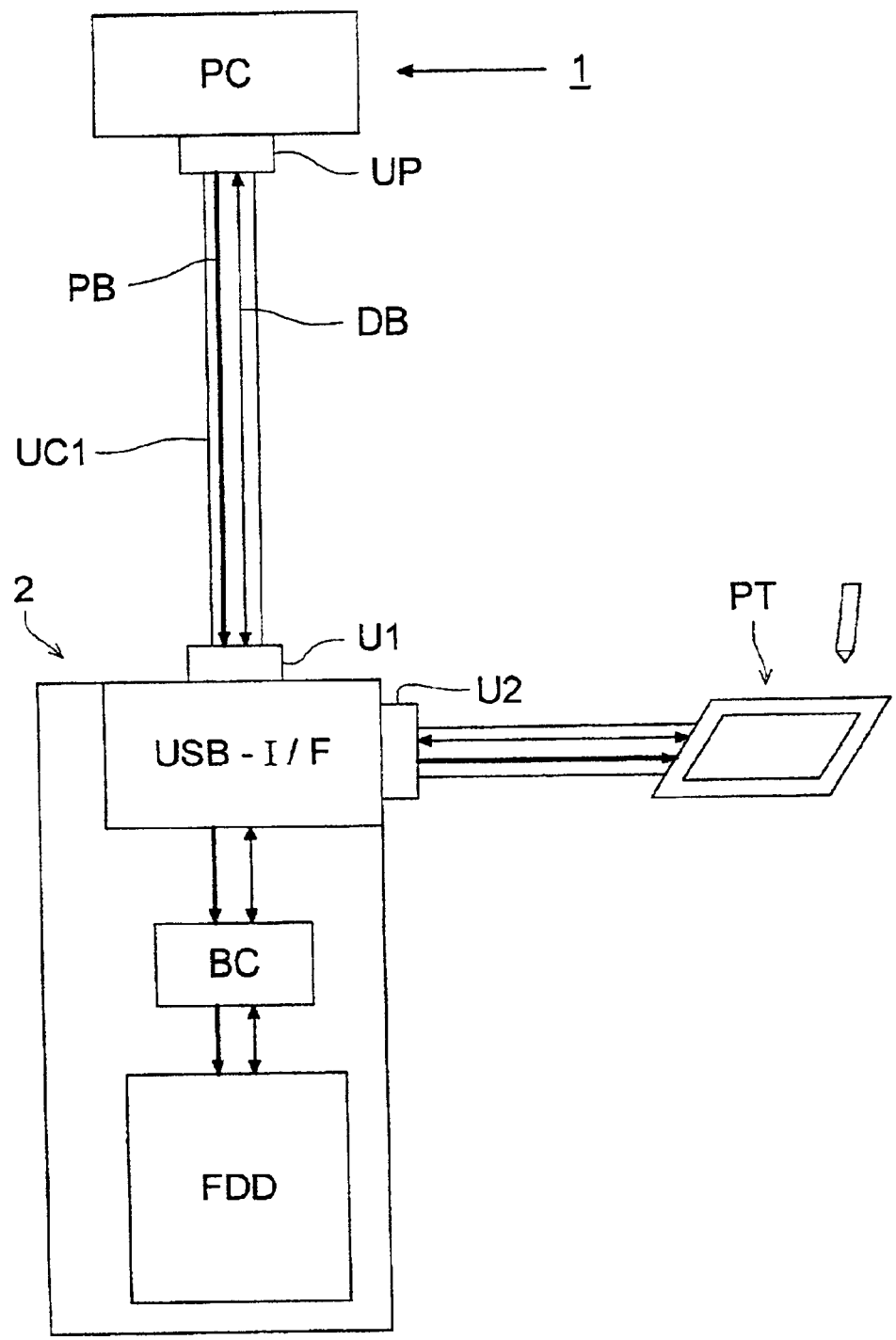
FIG. 1 shows an illustrative block-diagram of the first embodiment of the present invention.

Referring to the drawings, embodiments of the present invention will be detailed in the following. However, the scope of the present invention is not limited to the descriptions for the following embodiments.

The USB (Universal Serial Bus) or the IEEE1394, etc. can be employed as an interface embodied in the present invention.

Such the interface, of cause, includes a data bus on which data transmit bilaterally, and in addition to the data bus, also includes a path through which an electronic-power for driving a device can be supplied to the device.

There have been two kinds of the USB interfaces, one of which is a low-speed version having a communication rate of 1.5 Mbps, and another one of which is a high-speed version having a communication rate of 12 Mbps. In both of the low-speed and high-speed versions, a USB cable, comprising a pair of signal lines and a pair of power lines, is utilized. Although both of the versions suite low-speed or medium-speed communication at present, a new standard, recently announced to the public, allows the user to improve the communication rate higher than ever. Further, the USB interface can be utilized for connecting 127 peripheral devices at maximum, and suites applications of the plug-and-play mode. Some of the peripheral devices (such as a keyboard, a mouse, a tablet, a FDD, etc.), each of which consumes relatively small amount of electronic power, can be driven by the power current fed form the personal computer to which those devices are coupled (a bus-powered mode). On the other hand, the other peripheral device, which consumes relatively large amount of electronic power, incorporates a power unit to supply the power current by itself (a self-powered mode).

The IEEE1394 bus is a serial bus, which is also called as the serial SCSI, the FireWire or the iLINK, etc., and makes it possible to communicate each other at 400 Mbps as a maximum rate with a cable comprising two/pairs of signal lines and one pair of power lines. At present, the IEEE1394 bus is frequently utilized for communicating movie-image data or still-image data between a video camera and the personal computer.

A FDD (a Floppy-Disk Drive), a MOD (a Magneto-Optics Drive), a HDD (a Hard-Disk Drive), a CDD (a Compact-Disk Drive), a CD-R/RW (a Compact-Disk Drive Recordable/ReWritable), a DVDD (a Digital Video-Disk Drive or Digital Versatile Disk Drive), a ZipD (a high-capacity floppy-disk drive), etc., can be employed as the data-storing device embodied in the present invention. It is needless to say that various kinds of data-storing devices other than the above have been widely put in the market, and those can be also employed as the data-storing device embodied in the present invention.

Initially, the first embodiment of the present invention will be detailed in the following.

FIG. 1 shows an illustrative block-diagram of the first embodiment of the present invention.

Numeral 1 indicates a personal computer, having USB connecting port UP, serving as a USB interface. Personal computer 1 is coupled to data-storing device 2, embodied in the present invention, through USB cable UC1, one end of which is connected to USB connecting port UP, and another end of which is connected to first USB connecting port U1 of data-storing device 2.

USB cable UC1 comprises data communication path DB, indicated by the line having arrows at both ends, and power-supplying path PB, indicated by the bold line. The bilateral data communication is performed through data communication path DB, while the power current is supplied through power supplying path PB, and both are assembled as one cable.

Other than floppy-disk drive FDD serving as a data-storing unit, USB interface circuit USB-I/F, having first USB connecting port U1 and second USB connecting port U2, and bridge section BC are equipped in the interior of data-storing device 2.

Since the USB interface itself comprises data communication path DB and power-supplying path PB as mentioned above, personal computer 1 supplies the electric power for driving floppy-disk drive FDD through USB interface circuit USB-I/F and further through bridge section BC, while performing the bilateral data communication with data-storing device 2. Incidentally, although the default interface of floppy-disk drive FDD is not the USB interface, bridge section BC conducts a data/signal converting operation so that personal computer 1 can recognize floppy-disk drive FDD as a USB device.

Further, although the electronic power is supplied to floppy-disk drive FDD through bridge section BC in the configuration shown in FIG. 1, it is also applicable that the power-supplying path and the data communication path are separately disposed in the interior of data-storing device 2.

Still further, since data-storing device 2 comprises a plurality of USB connecting ports, another device can be further coupled to data-storing device 2 by using second USB connecting port U2, which is not used for coupling to personal computer 1. The electronic power for driving such "the other device" is supplied from personal computer 1 through the USB interface. Although pen-tablet PT, having a feature of low-power consumption, is coupled to data-storing device 2 through second USB connecting port U2 in the first embodiment shown in FIG. 1, it is also possible to connect a keyboard, mouse, etc., which have a feature of low-power consumption as well.

Still further, it is needless to say that, other than the data-storing devices mentioned above, a scanner, a memory-card reading/writing device, etc. can be employed as the data-storing device embodied in the present invention.

Next, the second embodiment of the present invention will be detailed in the following.

Figure 2:
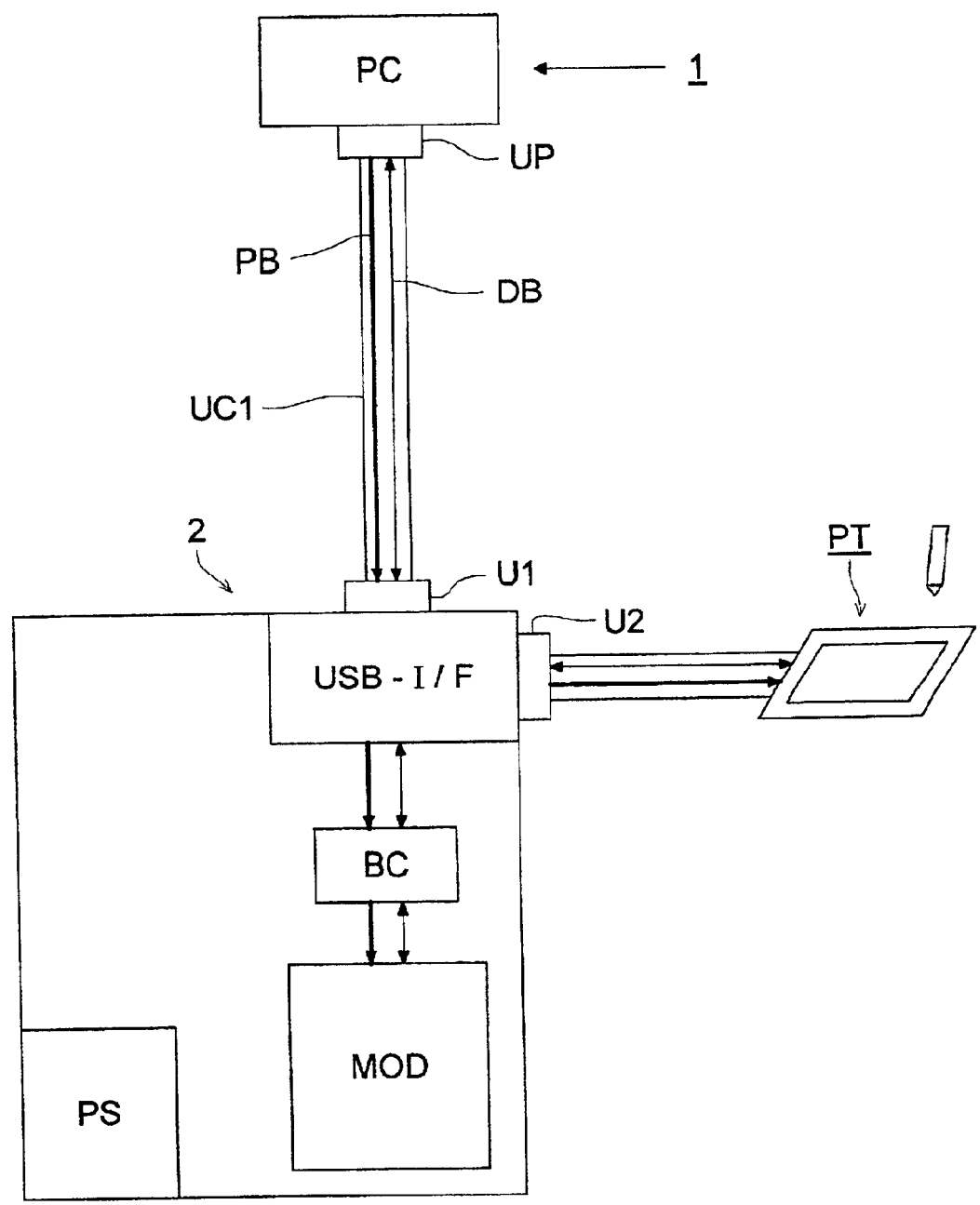
FIG. 2 shows an illustrative block-diagram of the second embodiment of the present invention.

FIG. 2 shows an illustrative block-diagram of the second embodiment of the present invention. In FIG. 2, the same structural elements as those shown in FIG. 1 are denoted by the same reference numerals.

In this configuration, data-storing device 2 comprises USB interface circuit USB-I/F, bridge section BC, magneto-optics drive MOD serving as a data-storing unit, first USB connecting port U1 and second USB connecting port U2, and further, power-supply unit PS, serving as a power-supply section of the device.

Since a large amount of electronic power is consumed for driving magneto-optics drive MOD serving as a data-storing unit, the electronic power for driving magneto-optics drive MOD is supplied from power-supply unit PS. Therefore, provided with the power-supply section of the device, which supplies the auxiliary power current to the data-storing unit, it becomes possible that the data-storing device consuming a large amount of electronic power is coupled to the personal computer and another device is further coupled to the data-storing device through the USB interface.

Further, although personal computer 1 supplies the electronic power for driving USB interface circuit USB-I/F and bridge section BC in the configuration shown in FIG. 2, it is also possible that power-supply unit PS supplies the electronic power for driving them, instead of personal computer 1.

Next, the third embodiment of the present invention will be detailed in the following.

Figure 3:
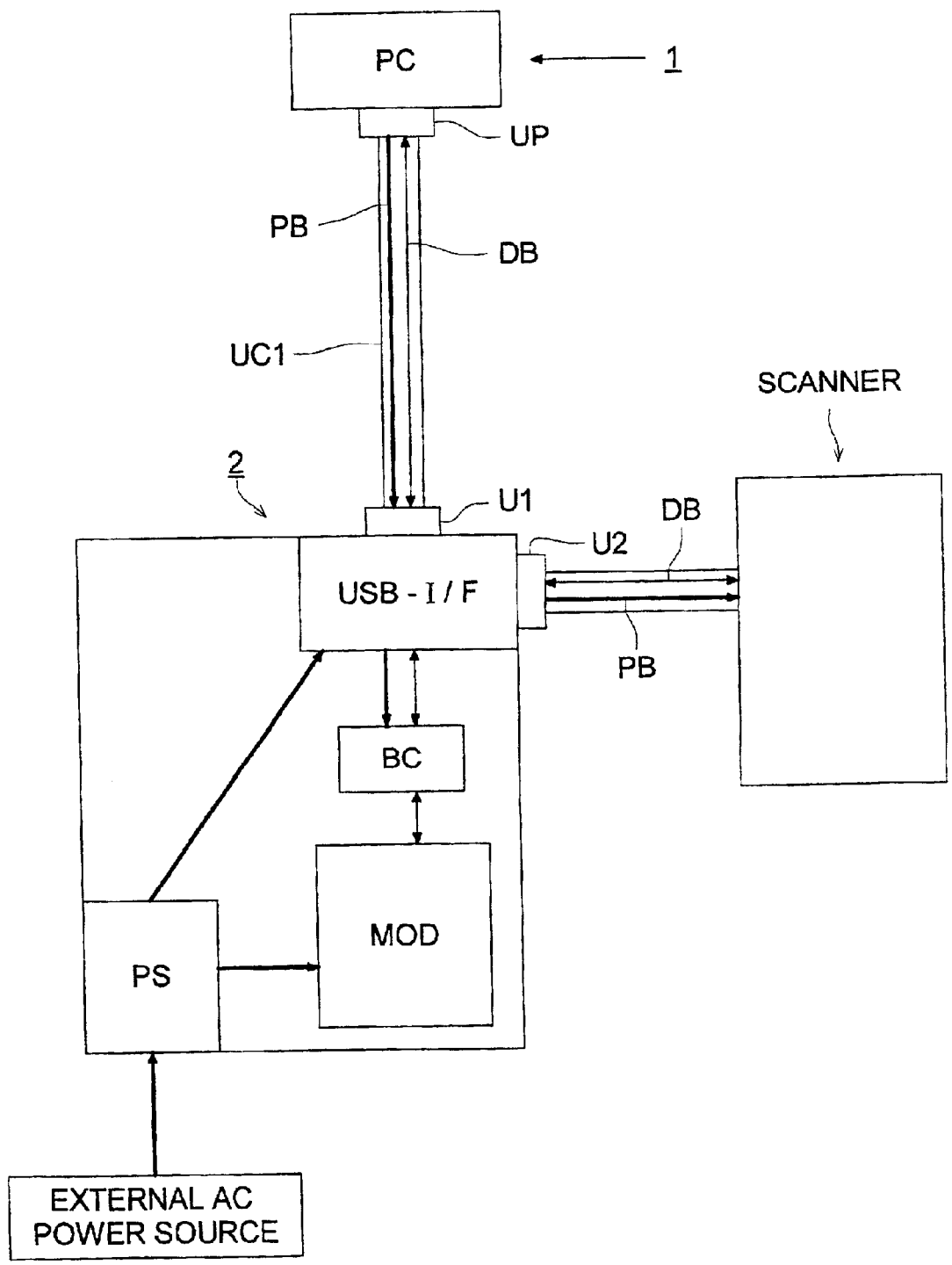
FIG. 3 shows an illustrative block-diagram of the third embodiment of the present invention.

FIG. 3 shows an illustrative block-diagram of the third embodiment of the present invention. In FIG. 3, the same structural elements as those shown in FIG. 1 and FIG. 2 are denoted by the same reference numerals.

In the configuration of the third embodiment, data-storing device 2 comprises USB interface circuit USB-I/F, bridge section BC, magneto-optics drive MOD serving as a data-storing unit, first USB connecting port U1 and second USB connecting port U2, and further, power-supply unit PS, serving as a power-supply section of the device, as well as that in the configuration of the second embodiment. It is possible, however, that the electronic power generated by power-supply unit PS can be further supplied to another device through power-supplying path PB included in USB interface circuit USB-I/F, by utilizing second USB connecting port U2, which is not used for the connection to personal computer 1. In the third embodiment, an exemplified scanner is coupled to data-storing device 2.

Accordingly, since the electronic power other than the power current supplied from the personal computer can be supplied to another device coupled to the data-storing device through the USB interface, it becomes possible that the other device of high-power consumption can be sufficiently driven by the electronic power supplied from power-supply unit PS without occurring any trouble. Of cause, it is also possible that many peripheral devices can be coupled to the Hub, which is coupled to the data-storing device through second USB connecting port U2.

Further, although personal computer 1 supplies the electronic power for driving USB interface circuit USB-I/F and bridge section BC in the configuration shown in FIG. 3, it is also possible that power-supply unit PS supplies the electronic power for driving them, instead of personal computer 1, as well.

Next, the fourth embodiment of the present invention will be detailed in the following.

Figure 4:
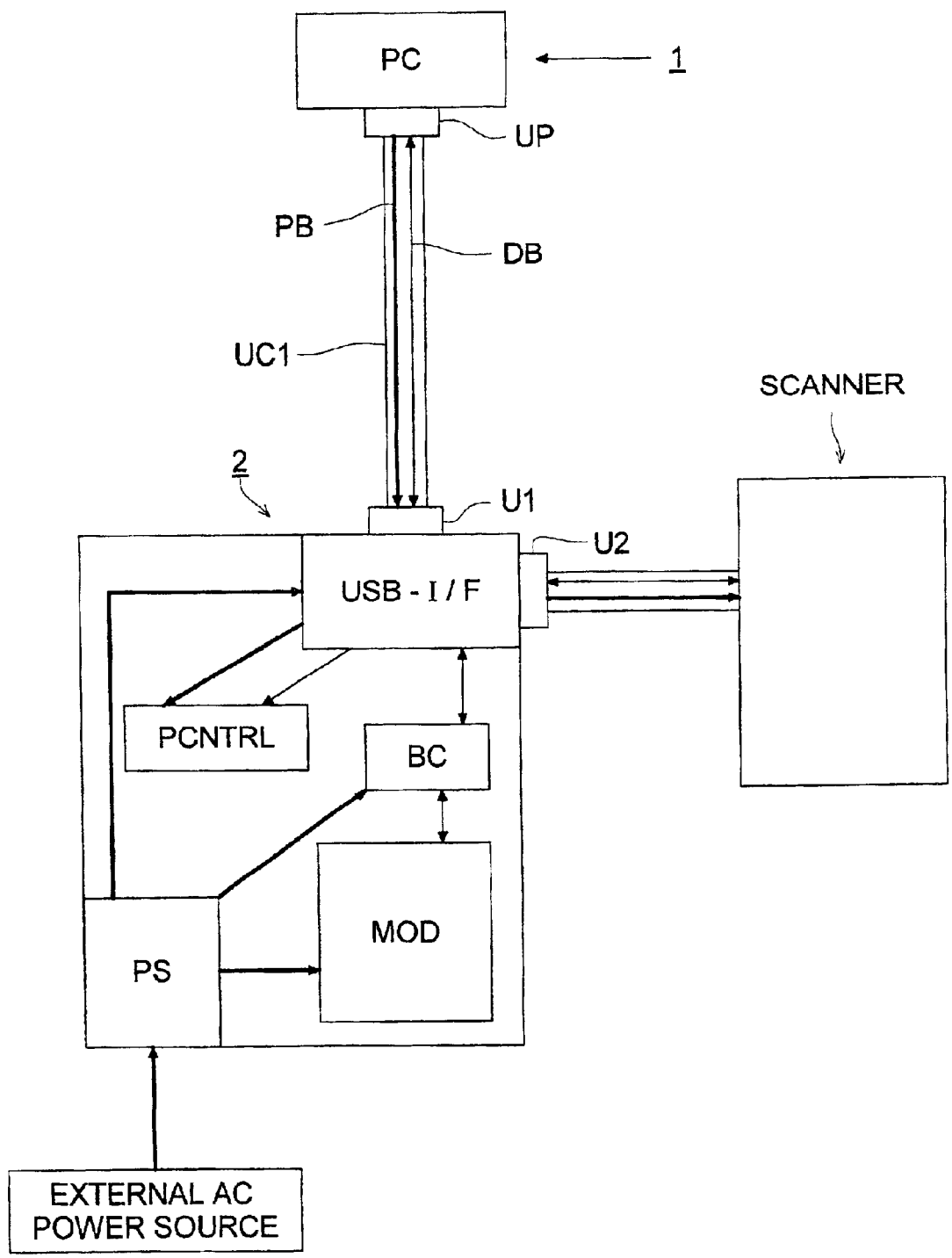
FIG. 4 shows an illustrative block-diagram of the fourth and the fifth embodiments of the present invention.

FIG. 4 shows an illustrative block-diagram of the fourth embodiment of the present invention. In FIG. 4, the same structural elements as those shown in FIGS. 1–3 are denoted by the same reference numerals.

In the configuration of the fourth embodiment, data-storing device 2 comprises USB interface circuit USB-I/F, bridge section BC, magneto-optics drive MOD serving as a data-storing unit, first USB connecting port U1 and second USB connecting port U2, and further, power-supply unit PS, serving as a power-supply section of the device, as well as that in the configurations of the second and third embodiments. Further, as well as that in the third embodiment, it is also possible that the electronic power generated by power-supply unit PS can be further supplied to another device through power-supplying path PB included in USB interface circuit USB-I/F, by utilizing second USB connecting port U2, which is not used for the connection to personal computer 1.

The feature of the fourth embodiment lies on a point that data-storing device 2 comprises power controller PCntrl, under the controlling actions of which the electronic power supplied through power-supplying path PB included in USB cable UC1 can be adjusted. In other words, the fourth embodiment is featured by the point that, when the electronic power generated by the power-supply section of the data-storing device is supplied to another device, power controller PCntrl can adjust an amount of electronic power to be supplied to the other device.

Referring to FIG. 4, the features of the fourth embodiment will be detailed in the following. The scope of the present invention, however, is not limited to the fourth embodiment.

In FIG. 4, bold lines with arrows indicate the power-supplying path, while slender lines with arrows indicate the data-communicating line.

Data-storing device 2 is coupled to personal computer 1 with USB cable UC1, which comprises data communication path DB and power-supplying path PB. In other words, USB cable UC1 has a power-supplying function as well as a bilateral data communicating function, and is connected to first USB connecting port U1.

USB interface circuit USB-I/F, having first USB connecting port U1 and second USB connecting port U2 as aforementioned, is equipped in the interior of data-storing device 2. As aforementioned, first USB connecting port U1 is utilized for the connection with personal computer 1, while second USB connecting port U2 is utilized for the connection with another device. In the fourth embodiment, an exemplified scanner is coupled to data-storing device 2 through second USB connecting port U2.

USB interface circuit USB-I/F is coupled to power controller PCntrl, serving as a power controlling section. Power-supply unit PS, serving as a power-supply section of the device, converts an alternative power current fed from an external AC power source to a direct power current, which is supplied to magneto-optics drive MOD, USB interface circuit USB-I/F, etc.

Further, in the fourth embodiment, the default interface of magneto-optics drive MOD is converted to the USB interface through bridge section BC, serving as a data bridging circuit. Accordingly, magneto-optics drive MOD can be utilized as a device having the USB interface by converting data, even if the default interface of magneto-optics drive MOD is not the USB interface (for instance, ATAPI, SCSI, etc.). It is needless to say, however, that bridge section BC is not necessary, when the default interface of magneto-optics drive MOD is the USB interface. Incidentally, although power-supply unit PS supplies the electronic power for driving bridge section BC in the fourth embodiment, it is also applicable that the electronic power for driving bridge section BC is supplied through USB interface circuit USB-I/F.

Power controller PCntrl, to which USB interface circuit USB-I/F supplies the electronic power, conducts controlling actions for adjusting the power-distributing operation from power-supply unit PS to each of the devices and units. Concretely speaking, power controller PCntrl controls an amount of electronic power to be supplied to the device coupled through second USB connecting port U2, while supplying the electronic power to magneto-optics drive MOD.

For instance, the controlling actions described as follow would be possible.

EXAMPLE 1

When a large amount of power current is required for driving magneto-optics drive MOD, the controlling action is to reduce the power current to be supplied from power-supply unit PS to the other device through second USB connecting port U2.

EXAMPLE 2

When a large amount of power current is required for driving magneto-optics drive MOD, the controlling action is to increase the output power current of power-supply unit PS itself, so as to increase the power current to be supplied from power-supply unit PS to the other device through second USB connecting port U2.

EXAMPLE 3

When a small amount of power current is required for driving magneto-optics drive MOD, the controlling action is to increase the power current to be supplied from power-supply unit PS to the other device through second USB connecting port U2.

EXAMPLE 4

When a small amount of power current is required for driving magneto-optics drive MOD, the controlling action is to decrease the output power current of power-supply unit PS itself, so as to reduce the power current to be supplied from power-supply unit PS to the other device through second USB connecting port U2.

EXAMPLE 5

When a maximum amount of power current, being a suppliable upper-limit of power-supply unit PS, is required for driving magneto-optics drive MOD, the controlling action is to stop supplying the power current to another device.

The introduction of the abovementioned controlling actions makes it possible to effectively perform the whole controlling operation of the device coupled through the interface, resulting in improvement of the total efficiency and the saving-energy property.

Incidentally, in the above configuration, the power current is adjusted so as to maintain at least a minimum amount of power current required for flowing into the power current path as specified in the USB or the IEEE1394 standard. Conversely, the power current is also adjusted so as not to exceed a maximum amount of power current, being an upper-limit durable for the power current path included in the interface.

Such the upper-limit or the lower-limit can be freely set at a value within the scope of the standards or the specifications of the product.

Further, it is also applicable that power-supply unit PS supplies the power current for driving power controller PCntrl. In this case, the electronic power outputted from personal computer 1 can be directly supplied to the other device, coupled to data-storing device 2, through second USB connecting port U2.

Still further, it is also applicable that bridge section BC is coupled to magneto-optics drive MOD through power controller PCntrl.

Still further, it is also applicable configuration that power-supply unit PS supplies the total power current only to power controller PCntrl, which distributes the total power current among another device and units.

Referring to FIG. 4 again, the fifth embodiment will be detailed in the following. The configuration of the fifth embodiment is substantially the same as that of the fourth embodiment.

In the fifth embodiment, power controller PCntrl, serving as a power controlling section, controls the switching status of the power current supplied to the other device through second USB connecting port U2, in response to whether or not power-supply unit PS, serving as a power-supply section of the device, is turned ON.

Concretely speaking, only when power controller PCntrl detects that power-supply unit PS is activated through USB interface circuit USB-I/F, power controller PCntrl determines that power-supply unit PS has a sufficient capacity for supplying the power current, and turns ON the power current to be supplied to the other device coupled through second USB connecting port U2.

For this purpose, it is a desirable configuration that the electronic power for driving power controller PCntrl is fed from personal computer 1 through the USB interface.

Further, although power-supply unit PS is not directly coupled to power controller PCntrl in the configuration shown in FIG. 4, it is also applicable that those are directly coupled each other to detect the operating status of power-supply unit PS.

The abovementioned controlling operation makes it possible to optimally control the power-supplying status for the device, coupled to data-storing device 2, in response to the operating status of power-supply unit PS.

Next, referring to the block-diagram shown in FIG. 5, the sixth embodiment will be detailed in the following. Although the configuration of the sixth embodiment is substantially similar to those of the fourth and fifth embodiments, the difference between them lies on the point that the configuration of the sixth embodiment comprises a detecting section to detect and collect information pertaining to the device currently coupled. Further, the controlling operation in the sixth embodiment, which is performed by the power controlling section on the basis of detected results of the detecting section, is also different from those in the fourth and fifth embodiments. In other words, in the sixth embodiment, the detecting section detects the devices coupled through USB interface circuit USB-I/F, so that power controller PCntrl, serving as a power controlling section, adjusts the power-supplying mode on the basis of the information detected by the detecting section.

Figure 5:
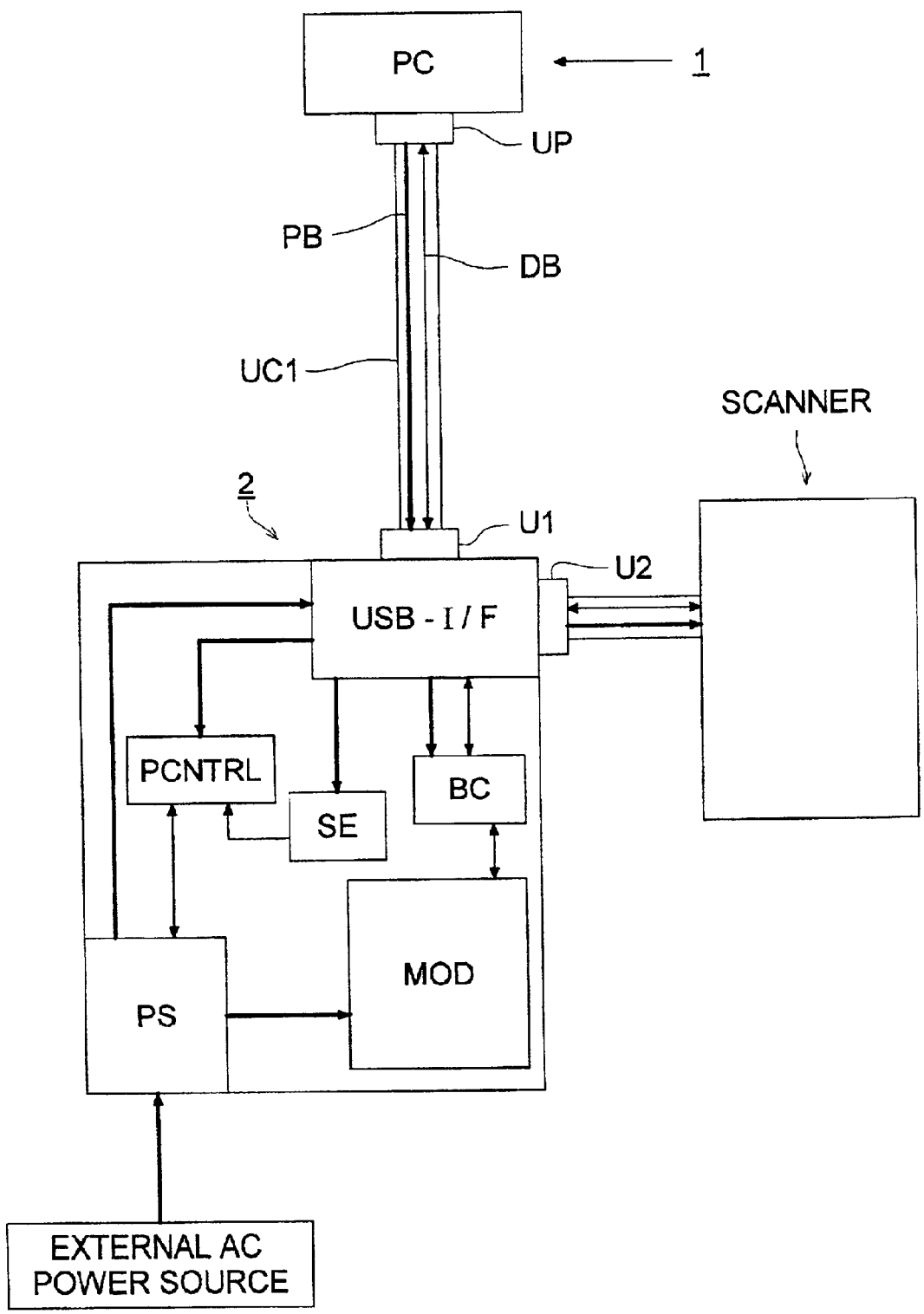
FIG. 5 shows an illustrative block-diagram of the sixth embodiments of the present invention.

The distinguished block illustrated in the block-diagram shown in FIG. 5 is sensor SE, serving as a detecting section. The sensor SE has a function of obtaining information pertaining to the device currently coupled through USB interface circuit USB-I/F.

Since sensor SE detects all of the devices and units currently coupled through USB interface circuit USB-I/F, it is needless to say that sensor SE also detects magneto-optics drive MOD through bridge section EC.

Although, in the sixth embodiment, sensor SE is coupled to magneto-optics drive MOD through USB interface circuit USB-I/F and bridge section EC, the configuration in which sensor SE is directly coupled to bridge section BC or magneto-optics drive MOD is also applicable.

When power controller PCntrl, serving as a controlling section, receives the information pertaining to the devices and units currently coupled and detected by sensor SE, power controller PCntrl sends command signals in response to the states of the devices to power-supply unit PS.

For instance, the controlling actions described as follow would be possible in addition to the examples cited in the fourth embodiment.

EXAMPLE 6

When detecting that another device is coupled, the controlling action is to change the operating mode of magneto-optics drive MOD.

EXAMPLE 7

When detecting that another device is coupled, the controlling action is to change the operating mode of magneto-optics drive MOD corresponding to a power level required for the detected device.

EXAMPLE 8

In EXAMPLE 6 or EXAMPLE 7, the controlling action is to change the rotational frequency of the motor for rotating the magneto-optics disc.

EXAMPLE 9

In EXAMPLE 6 or EXAMPLE 7, the controlling action is to change the seek speed of magneto-optics drive MOD.

EXAMPLE 10

In EXAMPLE 6 or EXAMPLE 7, the controlling action is to change the frequency of the drive-clock signals employed in magneto-optics drive MOD.

EXAMPLE 11

The controlling action is to change the operating mode of magneto-optics drive MOD corresponding to a number of other devices coupled.

EXAMPLE 12

In case that the data-storing device is a writing-type device, the controlling action is to keep the mode of the power-supplying unit fixed during caching and/or writing operations in order to maintain its operation.

EXAMPLE 13

In case that the data-storing device incorporates a storing-unit having operating modes, which are different each other in its (peak) power/current consumption, the controlling action is to select or change one of the operating modes depending on the operating states and/or power dissipations of other devices coupled.

EXAMPLE 14

The controlling actions are performed in an arbitral combination of the abovementioned examples.

Since the DC power source, generated by converting the AC power source fed from the outside, can be effectively distributed to the devices and units concerned by performing the abovementioned controlling actions, it becomes possible to harmonize the power conditions of the external devices coupled through the interface, resulting in improvement of the efficiency of the whole system.

On the other hand, although the efficiency of magneto-optics drive MOD, serving as a data-storing unit, would be lowered in the sixth embodiment, it becomes possible to improve the efficiency of the whole system by increasing the capacity of the power current to be supplied to the external devices.

Further, it is also desirable that the connecting status of the external devices is periodically detected with a predetermined time interval, to change the power-supplying status in a time domain.

Still further, it is also applicable that power controller PCntrl has a function of the sensor. Such the embodiment would desirably simplify the circuit configuration, resulting in cost-reduction of the data-storing device.

Next, the seventh embodiment will be detailed in the following. The seventh embodiment is a variation of the sixth embodiment described in the above.

As aforementioned, USB-interface circuit USB-I/F makes it possible to supply the power current from the original connecting device (mainly being a personal computer) to the device(s) coupled through it.

According to the present invention, since an amount of the abovementioned power current supplied from the original connecting device is not an object to be controlled by the power controller mentioned above, it is possible to guarantee a minimum amount of the power current for driving the devices coupled through the interface, while performing the controlling actions for the power supply.

Next, the eighth embodiment will be detailed in the following. The eighth embodiment is a variation of the sixth embodiment described in the above, as well as the seventh embodiment.

In the eighth embodiment, power controller PCntrl controls the power-supplying mode of the whole system, so as to share a total amount of the power current supplied from the original connecting device and the other power current supplied from power-supply unit PS among the devices coupled through the interface.

Accordingly, since the suppliable power current can be shared among the devices coupled through the interface on the basis of the overall needs of the devices, it becomes possible to efficiently operate the whole system without generating any power loss.

Next, the ninth embodiment will be detailed in the following.

In the configuration of the ninth embodiment, the power current for driving power controller PCntrl is supplied from personal computer 1 through USB-interface circuit USB-I/F, as aforementioned.

Accordingly, power controller PCntrl can be always activated, even if power-supply unit PS is deactivated.

Next, referring to FIG. 6, the tenth embodiment will be detailed in the following.

Figure 6:
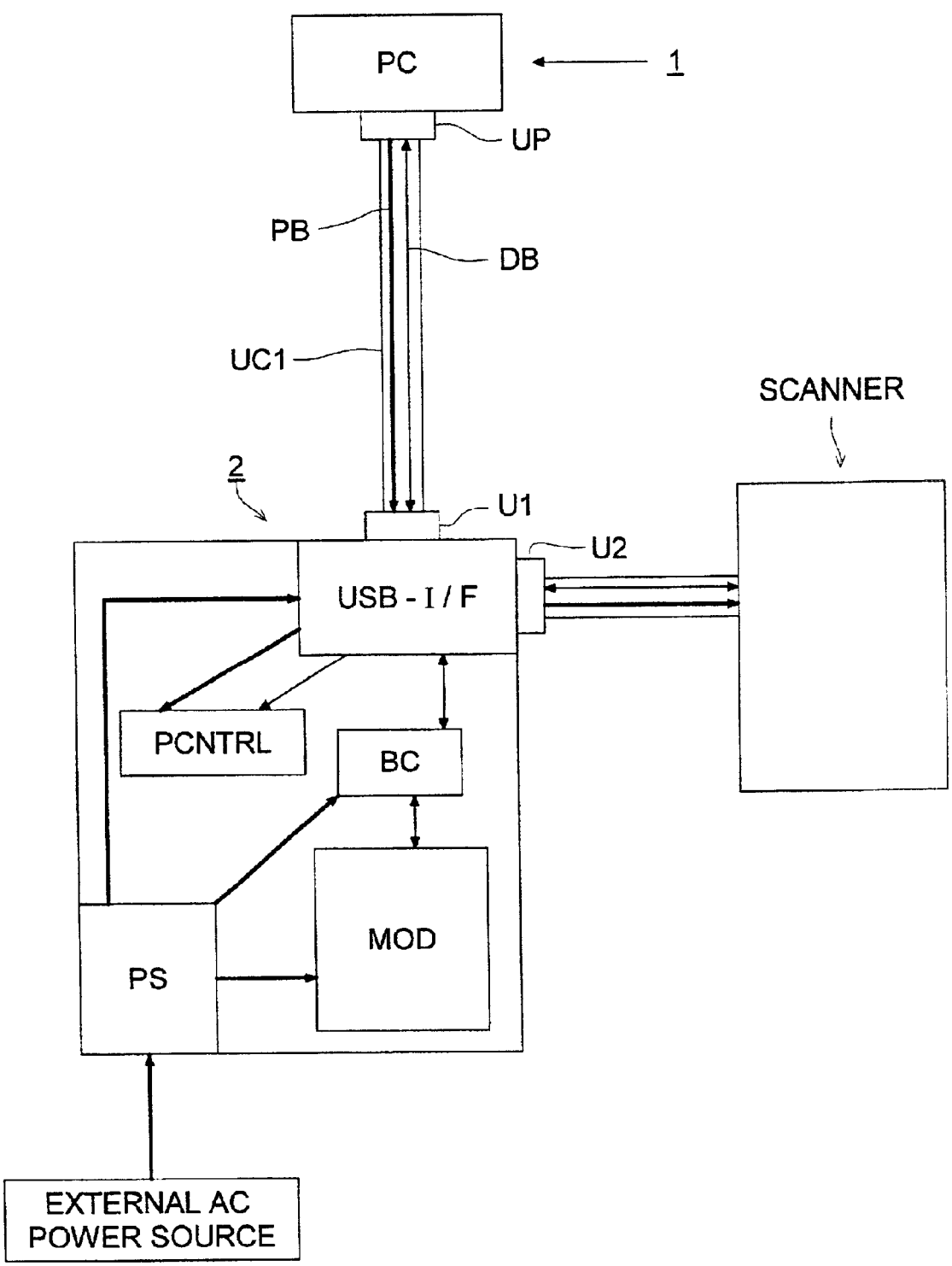
FIG. 6 shows an illustrative block-diagram of the tenth embodiments of the present invention.
Figure 7:
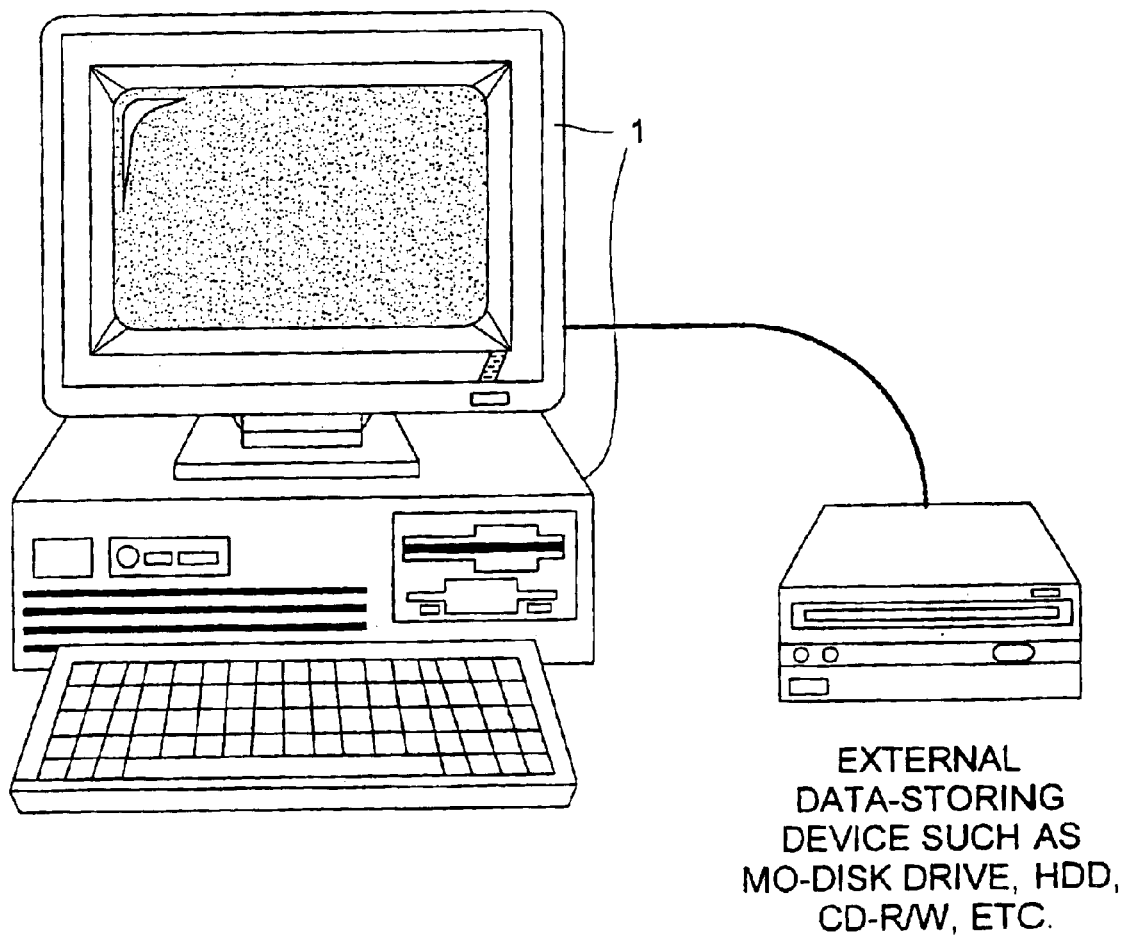
FIG. 7 shows a view of a personal computer and a conventional external data-storing device, which are coupled each other.
Figure 8:
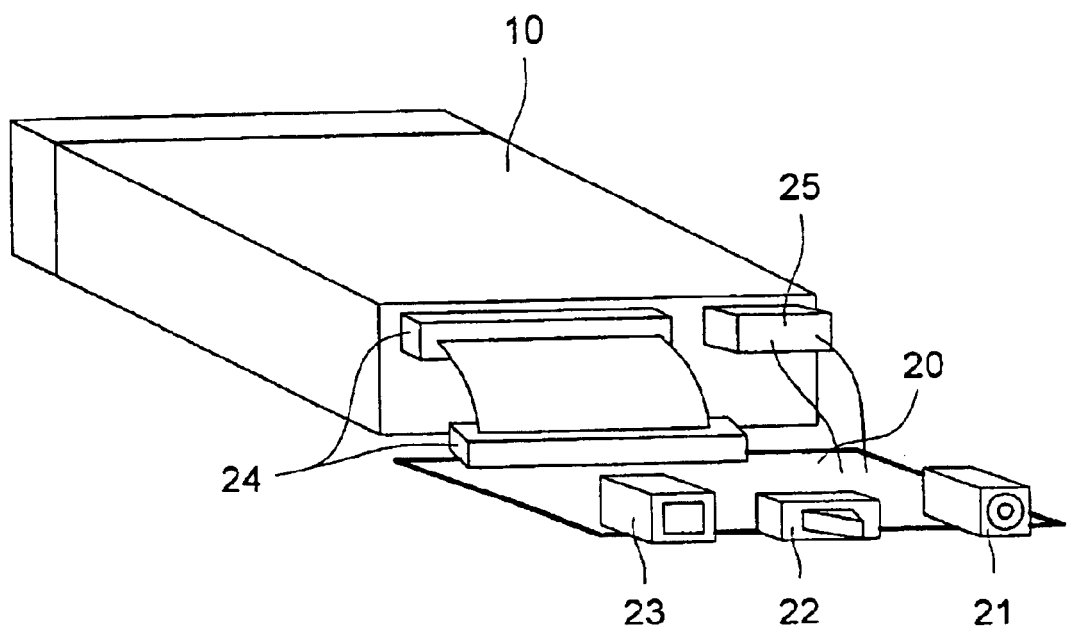
FIG. 8 shows an example of an outside configuration of a conventional external data-storing device having the USB and/or the IEEE1394 interface.

Although the configurations shown in FIG. 6 and FIG. 4 are similar relative to each other, the difference between them lies on the point that the power current for driving power controller PCntrl can be also supplied from power-supply unit PS in the configuration shown in FIG. 6. Further, power controller PCntrl has a function of switching the power sources for driving itself.

Concretely speaking, when power-supply unit PS is deactivated, the power current for driving power controller PCntrl is supplied from personal computer 1 through USB-interface circuit USB-I/F, while, when power-supply unit PS is activated, the power current is supplied from power-supply unit PS. Thus, it becomes possible to guarantee the power-supplying operation for the devices coupled through the interface.

According to the present invention, it becomes possible to obtain the following effects.

(1) Since the data-storing device comprises a plurality of USB-connecting ports, another device can be further coupled to the data-storing device by using the second USB-connecting port, which is not used for coupling to the personal computer.

(2) Provided with the power-supply section of the device, which supplies the auxiliary power current to the data-storing unit, it becomes possible that the data-storing device consuming a large amount of electronic power is coupled to the personal computer and another device is further coupled to the data-storing device through the USB interface.

(3) Since the electronic power other than the power current supplied from the personal computer can be supplied to another device coupled to the data-storing device through the USB interface, it becomes possible that the other device of high-power consumption can be sufficiently driven by the electronic power supplied from power-supply unit PS without occurring any trouble. Further, of cause, it is also possible that many peripheral devices can be coupled to the Hub, which is coupled to the data-storing device through the second USB-connecting port.

(4) It becomes possible to effectively perform the whole controlling operation of the device coupled through the interface, resulting in improvement of the total efficiency and the saving-energy property.

(5) It becomes possible to optimally control the power-supplying status for the device, coupled to the data-storing device, in response to the operating status of the power-supply unit.

(6) Since the DC power source, generated by converting the AC power source fed from the outside, can be effectively distributed to the devices and units concerned, it becomes possible to harmonize the power conditions of the external devices coupled through the interface, resulting in improvement of the efficiency of the whole system. In other words, although the efficiency of the data-storing unit would be lowered, it becomes possible to improve the efficiency of the whole system by increasing the capacity of the power current to be supplied to the external devices.

(7) It becomes possible to guarantee a minimum amount of the power current for driving the devices coupled through the interface, while performing the controlling actions for the power supply.

(8) Since the suppliable power current can be shared among the devices coupled through the interface on the basis of the overall needs of the devices, it becomes possible to efficiently operate the whole system without generating any power loss.

(9) The power controller can be always activated, even if the power-supply unit is deactivated.

(10) It becomes possible to guarantee the power-supplying operation for the device coupled through the interface.

Disclosed embodiments can be varied by a skilled person without departing from the spirit and scope of the invention.

What is claimed is:

1. A device for storing data, comprising:

an interfacing circuit that comprises a data communication path through which said data can be bilaterally communicated between said device for storing data and an external device, which is coupled to said device for storing data with a first interface cable, and a first power-supplying path through which a power current can be bilaterally supplied between said device for storing data and said external device, wherein said first interface cable also comprises said data communication path and said first power-supplying path, and wherein a peripheral device can be also coupled to said device for storing data through a second interface cable;

a data-storing unit to store said data sent from said interfacing circuit;

a plurality of interface connecting ports serving as input/output terminals of said interfacing circuit, wherein said first interface cable can be connected to a first interface connecting port being one of said plurality of interface connecting ports, and wherein said second interface cable can be connected to a second interface connecting port being another one of said plurality of interface connecting ports; and a power-supply section to supply a first power current for driving said data-storing unit, wherein a second power current, being a part of said first power current output by said power-supply section, is also supplied to said peripheral device through a second power-supplying path included in said second interface cable connected to said second interface connecting port; and a power controller to control said interfacing circuit in such a manner that a third power current, supplied from said external device through said first interface connecting port, is further supplied to said peripheral device through said second interface connecting port, only when said power controller detects that said power-supply section is deactivated.

2. The device for storing data as recited in claim 1, wherein said external device is a personal computer and said data-storing unit is a magneto-optics disk drive.

3. A device for storing data, comprising:

an interfacing circuit that comprises a data communication path through which said data can be bilaterally communicated between said device for storing data and an external device, which is coupled to said device for storing data with a first interface cable, and a power-supplying path through which a power current can be bilaterally supplied between said device for storing data and said external device, wherein said first interface cable also comprises said data communication path and said power-supplying path;

a data-storing unit to store said data sent from said interfacing circuit;

a plurality of interface connecting ports serving as input/output terminals of said interfacing circuit, wherein said first interface cable can be connected to a first interface connecting port being one of said plurality of interface connecting ports, and a plurality of peripheral devices can be coupled to said device for storing data with a plurality of interface cables through said plurality of interface connecting ports other than said first interface connecting port;

a power-supply section to supply power currents for driving said plurality of peripheral devices and for driving units and sections included in said device for storing data wherein said units comprise said data-storing unit;

a detecting section to detect power-status information sets pertaining to amounts of said power currents required for driving said plurality of peripheral devices coupled through said plurality of interface connecting ports and required for driving said units and sections included in said device for storing data; and a power controller to adjust each of said amounts of said power currents to be distributed among said plurality of peripheral devices, said units and sections, on the basis of said power-status information sets detected by said detecting section.

4. The device for storing data as recited in claim 3, wherein a power current, supplied from said external device through said first interface connecting port and further supplied to one of said plurality of peripheral devices through one of said plurality of interface connecting ports, passes through said interfacing circuit.

5. The device for storing data as recited in claim 3, wherein said power controller controls a power-supplying mode of said device for storing data, so as to share a total amount of a power current, supplied from said external device coupled through said first interface connecting port, and another power current, supplied from a power-supply unit, among said plurality of peripheral devices coupled through said plurality of interface connecting ports other than said first interface connecting port.

6. The device for storing data as recited in claim 3, wherein said external device is a personal computer and said data-storing unit is a magneto-optics disk drive.

7. The device for storing data as recited in claim 3, wherein said power controller is driven by a power current supplied from said external device through said first interface connecting port.

8. The device for storing data as recited in claim 3, wherein said power controller is driven by a power current supplied from said power-supply section when said power-supply section is activated, while said power controller is driven by a power current supplied from said external device through said first interface connecting port when said power-supply section is deactivated.

* * * * *